United States Patent
Shenoda et al.

(10) Patent No.: US 6,389,130 B1
(45) Date of Patent: May 14, 2002

(54) PUBLIC SWITCHED TELEPHONE NETWORK CALL ROUTING USING DYAMIC ASYNCHRONOUS MODE TRANSFER BEARER VOICE TRUNKING

(75) Inventors: George Shenoda; Andrew P. Alleman, both of Portland, OR (US)

(73) Assignee: Oresis Communications, Beaverton, OR (US)

( * ) Notice: Subject to any disclaimer, the term of this patent is extended or adjusted under 35 U.S.C. 154(b) by 0 days.

(21) Appl. No.: 09/540,006

(22) Filed: Mar. 30, 2000

(51) Int. Cl.[7] .................. H04L 12/28; H04L 12/56; H04L 12/66; H04M 7/00
(52) U.S. Cl. ............. 379/221.08; 370/352; 370/395.51; 370/395.6; 370/410; 370/467
(58) Field of Search ................ 370/352, 353, 370/354, 356, 377, 384, 385, 389, 395, 396, 409, 410, 466, 467, 524, 395.51, 395.6; 379/219, 220.01, 221.08, 229, 230, 900

(56) References Cited

U.S. PATENT DOCUMENTS

| | | | |
|---|---|---|---|
| 6,169,735 B1 | * | 1/2001 | Allen, Jr. et al. ............ 379/220 |
| 6,181,786 B1 | | 1/2001 | Detampel, Jr. et al. . 379/205.01 |
| 6,205,214 B1 | | 3/2001 | Culli et al. ............ 379/220.01 |

* cited by examiner

*Primary Examiner*—Harry S. Hong
(74) *Attorney, Agent, or Firm*—Columbia IP Law Group, PC

(57) ABSTRACT

The distributed architecture switch of the invention provides a scalable, flexible switching device to route telephone calls and other data (e.g., frame relay, ISDN) over an asynchronous transfer mode (ATM) network. The switch includes multiple service modules that can be geographically disparate and function as a single switching device. The multiple service modules are coupled to a system controller that controls the service modules and passes messages between the service modules.

18 Claims, 9 Drawing Sheets

PUBLIC SWITCHED TELEPHONE NETWORK CALL ROUTING USING DYAMIC ASYNCHRONOUS MODE TRANSFER BEARER VOICE TRUNKING

RELATED APPLICATIONS

The present U.S. Patent application is related to the following U.S. Patent applications, which are filed concurrently with the present application and assigned to the corporate assignee of the present invention:

(1) U.S. Pat. Application Ser. No. 09/539,452, entitled "SCALABLE CARRIER CLASS SWITCH AND ITS APPLICATION TO INTRA-DOMAIN PUBLIC SWITCHED TELEPHONE NETWORK CALL ROUTING"; and (2) U.S. Pat. Application Ser. No. 09/539,297, entitled "MULTI-SERVICE INTERWORKING SWITCH USING DYNAMIC ASYNCHRONOUS TRANSFER MODE BEARER TRUNKING".

FIELD OF THE INVENTION

The invention relates to internetworking of multiple services using an asynchronous transfer mode (ATM) network. More particularly, the invention relates to use of dynamic ATM bearer trunking to support multiple services.

BACKGROUND OF THE INVENTION

Common Channel Signaling System No. 7 (SS7 or C7) is a global standard for telecommunications defined by the International Telecommunications Union (ITU) to define procedures and protocols by which network elements of public switched telephone networks (PSTNs) exchange information to provide call setup, routing and control. The ITU definition of SS7 allows for regional variations such as, for example, the American National Standards Institute (ANSI) and Bell Communications Research (Bellcore) standards in North America and the European Telecommunications Standards Institute (ETSI) standard used in Europe.

SS7 provides a framework in which telephone networks provide basic call setup, management, and tear down, wireless services, local number portability, enhanced call features (e.g., call forwarding, calling party name/number information, three-way calling), etc. SS7 messages are exchanged between network elements over bi-directional channels called signaling links. These messages are communicated out-of-band on dedicated channels rather than in-band on voice channels. Out-of-band signaling provides faster call setup times, more efficient use of voice circuits, improved control over fraudulent network usage, and other advantages, compared to in-band signaling.

FIG. 1 is a block diagram of a Common Channel Signaling System No. 7 (SS7) network. In general, each signaling point in an SS7 network is uniquely identified by a numeric point code. Point codes are carried in signaling message between signaling points to identify the source and destination points for the message. Signaling points use routing tables to select an appropriate signal path for a message.

Service switching points (SSPs), such as SSPs 130 and 132, are switches that originate, terminate, or relay calls. SSPs are typically located in end offices that are coupled to multiple telephones or other devices that use telephone service. Telephones, such as telephones 110, 112, 120 and 122, are coupled to SSPs via local connections. Facsimile machines, modems and other devices can also be coupled to SSPs 130 and 132. An SSP sends signaling messages to other SSPs to setup, manage, and release voice circuits required for a call. An SSP can also send a query message to a service control point (SCP), such as SCPs 170 and 172, which acts as a database for certain types of calls, for example, 1-800/888 calls. The SCP sends a response to the originating SSP with routing information for the dialed number.

Traffic between SSPs can be routed by signal transfer points (STPs), such as STPs 140, 142, 150, 152, 160 and 162. STPs operate to route incoming messages to an outgoing signal link based on routing information contained in an SS7 message. In other words, STs operate as network hubs and eliminate the need for direct links between signaling points. An STP can perform global title translation to determine a destination signaling point based on digits present in the signaling message.

Signaling links between signaling points are logically organized by link type according to the purpose of the link. Access ("A") links 180 connect a signaling end point (e.g., an SCP or SSP) to an STP. Only messages originating from or destined to the signaling end point are transmitted by an access link. Bridge ("B") links 182 connect an STP to another STP. Typically, a group of four bridge links interconnect peer (or primary) STPs (e.g., the STPs from one network to STPs of another network).

Cross ("C") links 184 connect STPs performing identical functions into a mated pair. A cross link is used only when an STP has no other route available to a destination signaling point due to, for example, a link failure. Diagonal ("D") links 186 connect secondary (e.g., local or regional) STP pairs in a quad-link configuration.

Extended ("E") links 188 connect an SSP to an alternate STP. Extended links provide an alternate signaling path if an SSP's primary STP cannot be reached via an access link. Fully associated ("F") links 190 can be used to connect two signaling end points (e.g., SSPs and SCPs). Fully associated links are generally not used in networks with STPs.

When a party initiates a call, the call is held at SSP servicing the caller. For example, if the party initiates the call from telephone 110, the call is held at SSP 130. SSP 130 then transmits the information necessary to locate the called location and determines if the called location is busy or available to accept the call. If the called party is telephone 112, SSP 130 can directly determine whether telephone 112 is busy.

If the call destination is a telephone that is not coupled to SSP 130, call information is routed through network 100 to the appropriate SSP. If, for example, the call destination is telephone 120 or telephone 122, SSP 130 routes call information to SSP 132. The call information can be routed directly between SSP 130 and SSP 132 by a fully associated link, if present. Otherwise, the call information can be routed, for example, to STP 142 via an access link to STP 152 via a diagonal link to STP 162 via a bridge link to SSP 132 via an access link. SSP 132 determines whether the destination telephone is available to receive the call and returns the appropriate information to SSP 130.

If the destination telephone is available to receive the call, a trunk is established through network 100 from the call source to the call destination to establish a talk path and the call is established. When the call is completed, the trunk is torn down (call tear down) and the call is terminated. Connections through network 100 are established for each call in a similar manner.

Current PSTNs are based on designs and hardware from the 1970s. As the usage of these PSTNs changes because of, for example, Internet access and related activities, traditional PSTNs have become less optimal and other networking protocols have been used for specific purposes. For example, many telephone companies maintain both PSTNs and asynchronous transfer mode (ATM) networks for supporting various services. However, maintaining multiple networks with multiple protocols and hardware components is more time consuming and more expensive than maintaining a single network type. What is needed is a single network that can efficiently support multiple types of network services.

SUMMARY OF THE INVENTION

A switching device having a distributed architecture is described. The switching device includes a system controller coupled to multiple service modules. Each of the service modules has a first interface to receive and transmit telephone calls, a second interface to receive and transmit data according to a first protocol, and a third interface to transmit and receive data according to a second protocol. Telephone calls received via the first interface and data received via the second interface are converted to the second protocol and routed to an external device. Data received from the third interface is converted to one of the first protocol and a telephone protocol and routed to the second interface, if converted to the first protocol, and routed to the first interface if converted to the telephone protocol.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A switching device having a distributed architecture is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The distributed architecture switch of the invention provides a scalable, flexible switching device to route telephone calls and other data (e.g., frame relay, ISDN) over an asynchronous transfer mode (ATM) network. The switch includes multiple service modules that can be geographically disparate and function as a single switching device. The multiple service modules are coupled to a system controller that controls the service modules and passes messages between the service modules.

Multiple Services Provided by Multiple Networks

Figure 2:
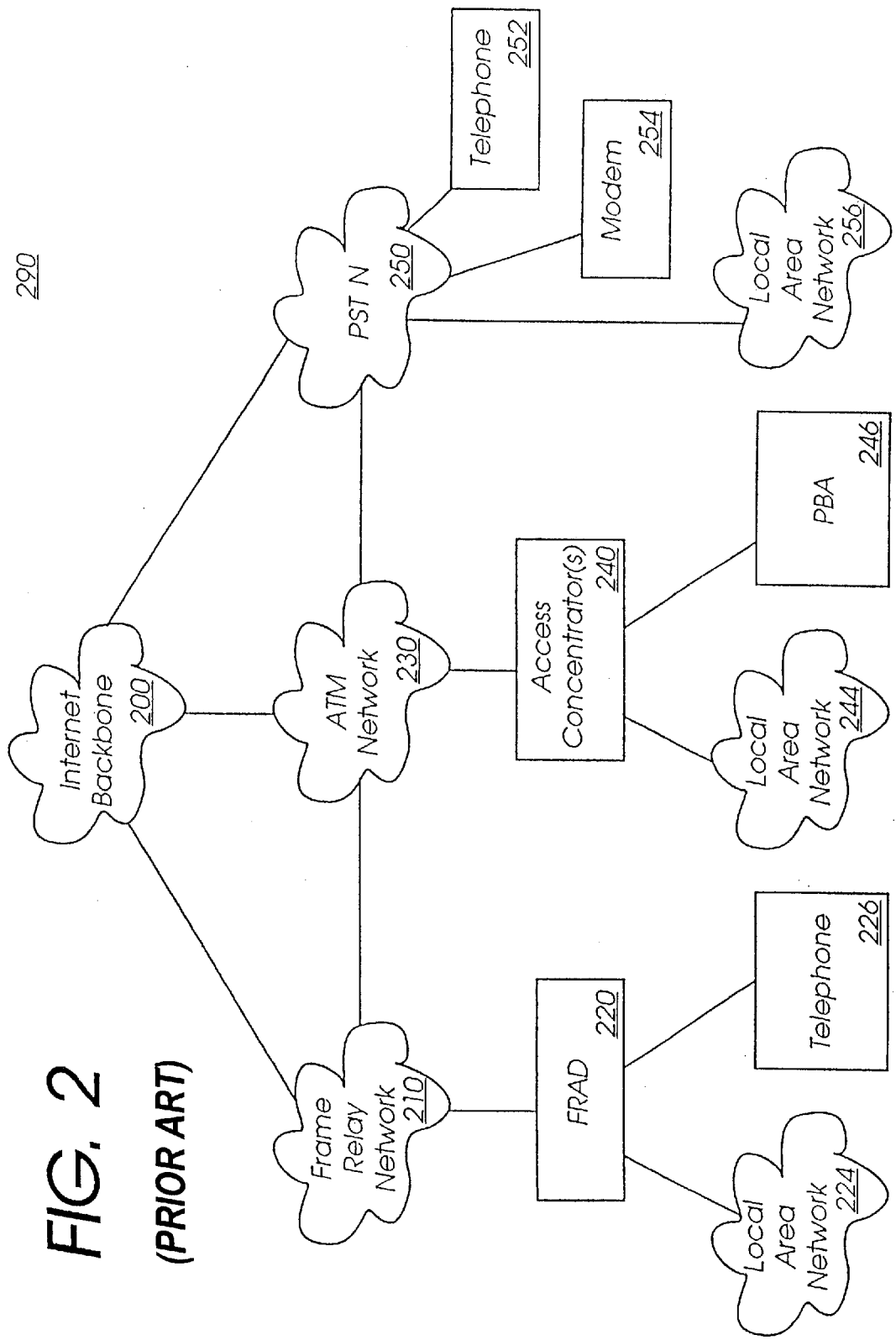
FIG. 2 is a block diagram of a network for providing multiple services.

FIG. 2 is a block diagram of a network for providing multiple services. Network configuration 290 is an interconnection of multiple networks using multiple protocols to provide services to multiple subscribers. However, network configuration 290 can be difficult and expensive to maintain.

Internet backbone 200 provides an interconnection between Internet service providers (ISPs) and other parties that have direct access to the Internet (not shown in FIG. 2). Frame relay network 210 is coupled to Internet backbone 200.

Local area network (LAN) 224 and telephone 226 are coupled to frame relay access device (FRAD) 220, which provides an interface between LAN 224 and telephone 226 and frame relay network 210. FRAD 220 is a router-type device that encapsulates data packets into frames, which can be variable in length, and sends the frames to frame relay network 210. FRAD 220 also sends frames through predefined virtual circuits to reach the appropriate destination. Other devices (not shown in FIG. 2) can also be coupled to FRAD 220. Other frame relay access devices (not shown in FIG. 2) can also be coupled to frame relay network 210.

Asynchronous Transfer Mode (ATM) network 230 is also coupled to Internet backbone 200. LAN 244 and PBX 246 are coupled to ATM network 230 via access concentrator(s) 240. Access concentrator(s) 240 provide an interface between various devices and ATM network 230. Other devices (not shown in FIG. 2) can also be coupled to access concentrator(s) 240. ATM network 230 is also coupled to frame relay network 210.

Figure 1:
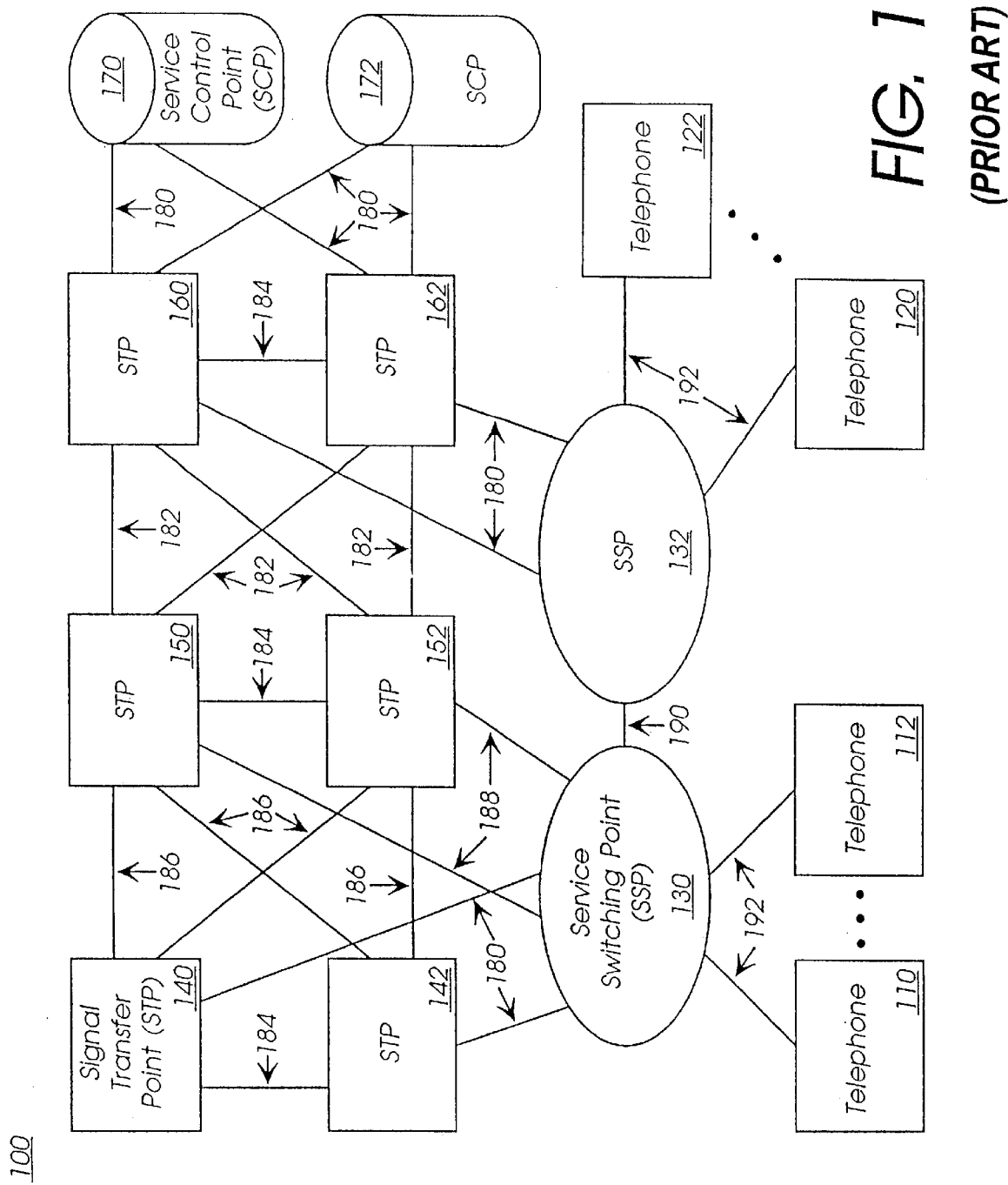
FIG. 1 is a block diagram of a Common Channel Signaling System No. 7 (SS7) network.

PSTN 250 is a telephone network such as network 100 of FIG. 1. PSTN 250 is coupled to Internet backbone 200 and ATM network 230. PSTN 250 can also be coupled to frame relay network 210. Telephone 252, modem 254 and LAN 256 can be coupled to PSTN 250 via an ordinary telephone line, an integrated services digital network (ISDN) connection or any other appropriate connection. Other devices can also be coupled to PSTN 250.

However, network configuration 290 requires multiple gateways and multiple network elements to provide multiple services. This results in an expensive, inefficient network configuration. Furthermore, there exists no simple, robust internetworking with existing PSTNs. The result is poor bandwidth utilization and traffic management.

Telephone Call Routine Over an ATM Network

Figure 3:
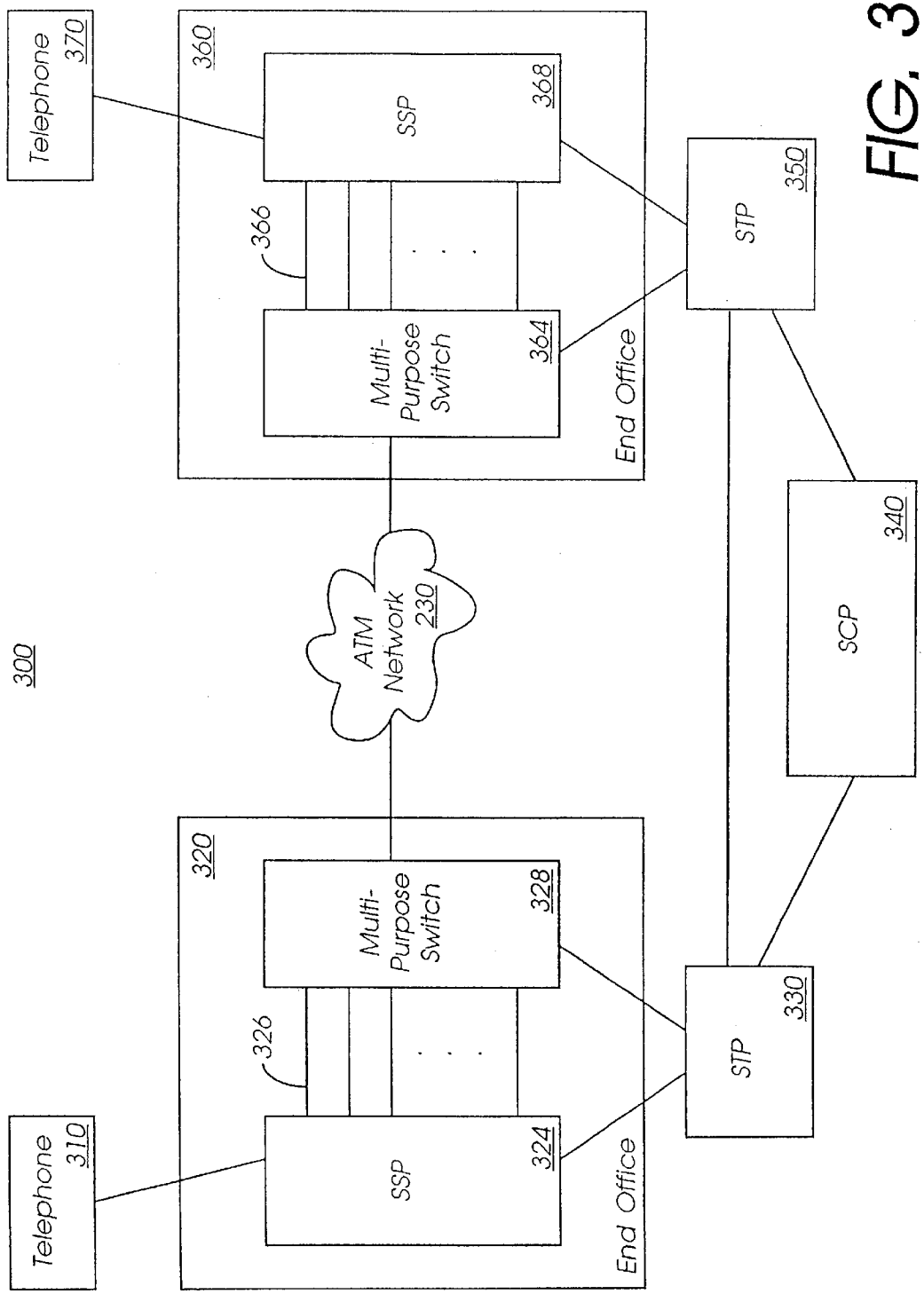
FIG. 3 is a block diagram of a network configuration for routing telephone calls over an ATM network.

FIG. 3 is a block diagram of a network configuration for routing telephone calls over an ATM network. The telephone calls can be voice and/or data calls. In general, network configuration 300 allows calls to be set up and torn down using SS7 components and protocols as well as ATM components and protocols. The call connection is routed over ATM network 230 using ATM components and protocols.

The following example describes routing of a telephone call originating from telephone 310 and destined for telephone 370. A user of telephone 310 dials the number of telephone 370 to initiate the call. Information describing the telephone call is communicated between telephone 310 and SSP 324 in end office 320. In one embodiment, the information communicated between telephone 310 and SSP 324 is the information communicated between telephone 310 and SSP 324 to initiate the telephone call according to the SS7 protocol, which is known in the art; however, additional and/or different information can also be communicated during call initialization.

In one embodiment, SSP 324 operates with STP 330, STP 350, and SSP 368 to determine, according to SS7 protocols, whether telephone 370 is available to receive the call from telephone 310. If necessary, SCP 340 can be included in the routing of the call request. A response as to whether or not telephone 370 is available to receive the call from telephone 310 is routed back to telephone 310 through SSP 368, STP 350, STP 330 and SSP 324 using SS7 protocols.

SSP 324 also communicates call information to multi-purpose switch 328. In one embodiment, SSP 324 and multi-purpose switch 328 are interconnected with Digital Signal Level 1 (DS-1) trunk (also called T1) lines; however, other connections, for example, DS-0 or DS-3 lines can be used. The DS signal hierarchy is part of the North American Digital Hierarchy (NADH). In an alternative embodiment, Synchronous Optical Network (SONET) or Synchronous Digital Hierarchy (SDH) signals can be used. In one embodiment SSP 324 and SSP 368 are Class 4 or Class 5 circuit switches used in PSTN and known in the art.

Multi-purpose switch 328 uses source and destination information from the SS7 signaling information to establish a connection between multi-purpose switch 328 and multi-purpose switch 364 over ATM network 230. In one embodiment, multi-purpose switch 328 establishes a virtual path, if necessary, through ATM network 230 (not shown in FIG. 3) to multi-purpose switch 364.

Within the virtual path, a virtual connection is maintained for each call routed between multi-purpose switch 328 and multi-purpose switch 364. Multiple calls between end office 320 and end office 360 can be serviced by one virtual path with virtual connections being established as necessary. Multiple virtual paths can be established between end office 320 and end office 360. Use of virtual paths through ATM network 230 provides the advantage that the virtual paths maintain a connection between multi-purpose switch 328 and multi-purpose switch 364 and multiple virtual connections can share the management overhead required to maintain the connection thereby reducing the per call overhead.

In one embodiment, an ATM cell header based on the source and destination information from the SS7 routing information includes a Virtual Path Identifier (VPI) that identifies a link of a virtual path and a Virtual Channel Identifier (VCI) that identifies a channel within a virtual path. The VPI and VCI are used by switches within ATM network 230 to route cells between source and destination devices. ATM network 230 can provide both permanent virtual circuits (PVCs) and switched virtual circuits (SVCs). PVCs are always available and SVCs require setup each time the virtual circuit is used. In one embodiment, ATM network 230 also supports multicast channels so that a single sender can establish a connection with several receivers.

Setting up virtual connections requires that each switch along the path determine whether that switch has enough capacity to support the additional connection. When voice information is being transmitted, sufficient capacity can be set aside to guarantee the flow and arrival of the audio data in a time-critical manner. In one embodiment, multiple switches interact to build a virtual connection and information is not transmitted until a virtual connection is established.

ATM network 230 also provides predictable quality of service (QoS) so that sufficient telephone call quality can be provided. Because ATM network 230 uses fixed-size cells for delivering data, throughput and bandwidth requirements for each call is known. Also, ATM network 230 is connection based and cells are delivered over virtual circuits in order, real-time audio information can be predictably delivered with predetermined quality. In one embodiment, QoS parameters are passed between switches of ATM network 230 during set up of virtual connections.

While network 300 is illustrated with a single telephone coupled to each SSP, multiple telephones can be coupled to each SSP. In addition, multiple end offices can be coupled to ATM network 230.

A System for Routing Telephone Calls Over an ATM Network

Figure 4:
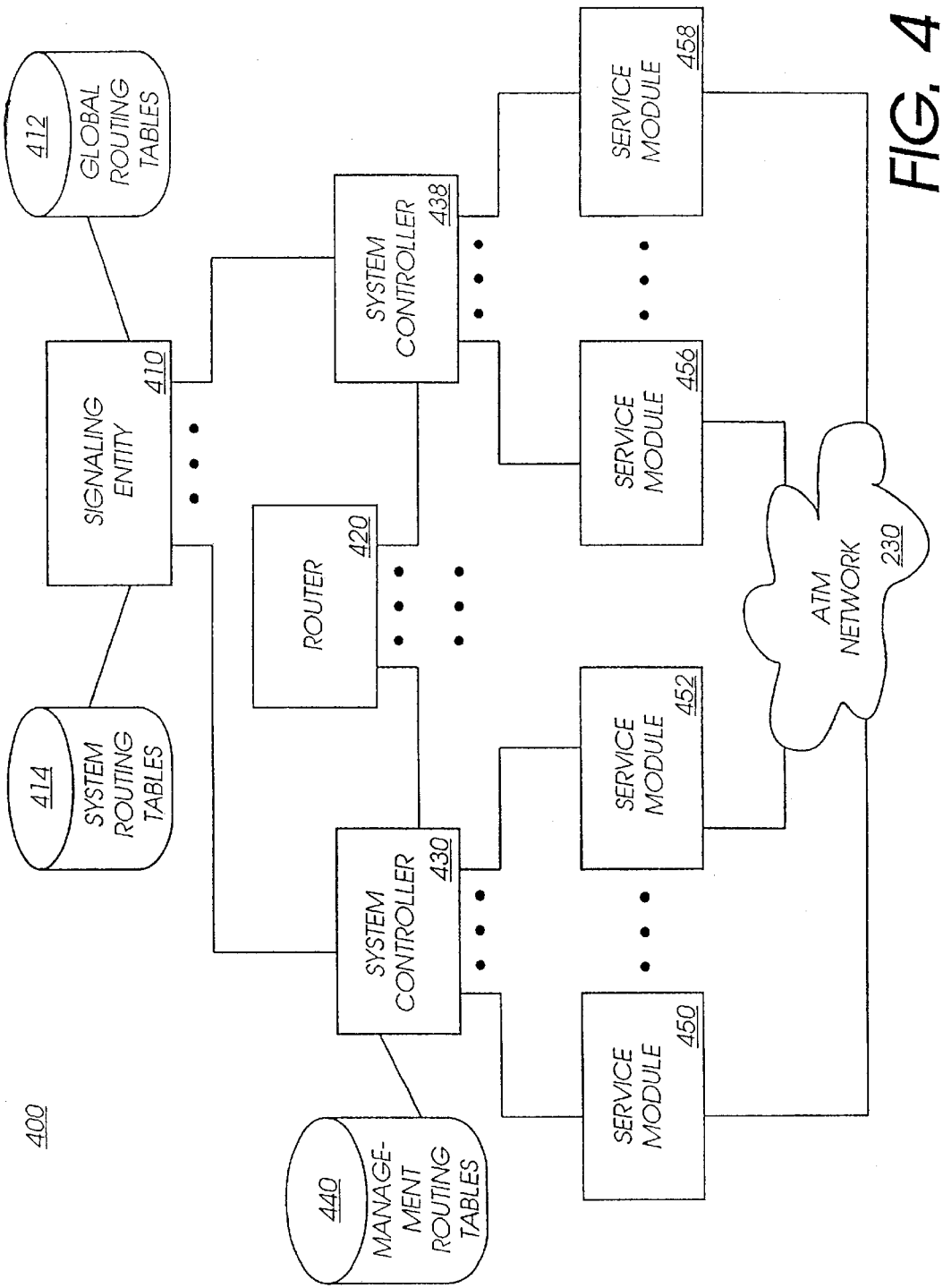
FIG. 4 is a block diagram of a system control hierarchy for routing telephone calls over an ATM network.

FIG. 4 is a block diagram of a system control hierarchy for routing telephone calls over an ATM network. System 400 is designed to support integrated signal processing within a single logical system that can scale from a single physical device to multiple physical devices. The architecture allows network components to be geographically diverse while operating as a single device. In one embodiment system 400 provides the functionality of one or more multi-purpose switches (e.g., 328 and 364 of FIG. 3).

In one embodiment, signaling entity 410 controls multiple system controllers (e.g., system controllers 430 and 438). Signaling entity 410 is coupled to system controllers 430 and 438 via permanent hierarchical connections for signaling control traffic. In one embodiment, the connections are virtual connections maintained by ATM network node interface (NNI) trunks. An NNI is an interface between ATM switches that operate as network nodes.

In one embodiment, global routing tables 412 are coupled to, or included in, signaling entity 410. Global routing tables 412 provide telephone number information to signaling entity 410. The telephone number information can be used to route telephone calls. System routing tables 414 can also be coupled to, or included in, signaling entity 410. System routing tables 414 provide information for routing telephone calls through ATM network 230.

Router 420 routes data between multiple system controllers. In one embodiment, up to 100 system controllers can be coupled to router 420 and to signaling entity 410; however, any number of system controllers can be used. Multiple routers and/or other network components can be used to route data between the system controllers.

In one embodiment, one of the system controllers acts as a master system controller. The remaining system controllers are peer system controllers. In the embodiment of FIG. 4, system controller 430 is the master system controller and system controller 438 is a peer system controller. System controller 430 is coupled to, or includes, management routing tables 440. Management routing tables 440 provide information to system controller 430 that can be used to route data between system controllers. For example, management routing tables 440 can indicate which service modules are coupled to which system controllers.

Each system controller can be coupled to one or more service modules. For example, service modules 450 and 452 are coupled to system controller 430 and service modules 456 and 458 are coupled to system controller 438. The service modules are coupled to ATM network 230 via switched or permanent peer connections for user traffic.

The service modules provide an interface between two or more services. For example, a service module can provide an interface between a telephone network and an ATM network. Other services, for example, frame relay, can also be supported.

For simplicity of description, system 400 is described in terms of chassis and modules. A chassis includes a system controller and one or more service modules coupled to the system controller (e.g., system controller 430 and service modules 450 and 452). Service modules are occasionally referred to as modules for short.

In one embodiment, each chassis is coupled, directly or indirectly, to system 400 via a physical ATM user network interface (UNI) and/or a network node interface (NNI). UNIs are typically an interface point between ATM end users and a private ATM switch, or between a private ATM switch and a public carrier ATM network. NNIs are typically used between ATM network nodes. UNIs and NNIs are defined by physical and protocol specifications available from the ATM Forum of Mountain View, Calif. In an alternative embodiment, other interconnections can be used. In one embodiment any UNI/NNI ports (e.g., OC12c, OC3c, DS3, DS 1/E1, NxDS1/E1) can be used to interconnect chassis. In one embodiment, redundant links are provided between chassis; however, redundant links are not required.

Virtual channel connections (VCCs) are established between chassis for control traffic to allow the various system entities to communicate. In one embodiment, a hierarchical set of permanent VCCs between the controller in a master chassis and each of the controllers in the remaining chassis of a switching system enables control traffic to be passed between system entities. The control VCCs are carried within a virtual path that includes signaling channels from user interfaces.

In one embodiment, for each chassis in a system, the system software creates internal permanent virtual connections connecting each service module to a local chassis controller. These connections are referred to as intra-chassis control VCCs. The intra-chassis control VCCs can also be configured manually. In one embodiment, each peer chassis has a user configured permanent virtual path connection to the corresponding master chassis. These connections are referred to as intra-system virtual permanent connections (VPCs). In one embodiment, a redundant intra-system VPC is configured between each peer chassis and the corresponding master chassis. In one embodiment, the master chassis also includes a signaling processor. The signaling processor supports signaling processing and call routing for the entire system.

Multi-Service Internetworking

Figure 5:
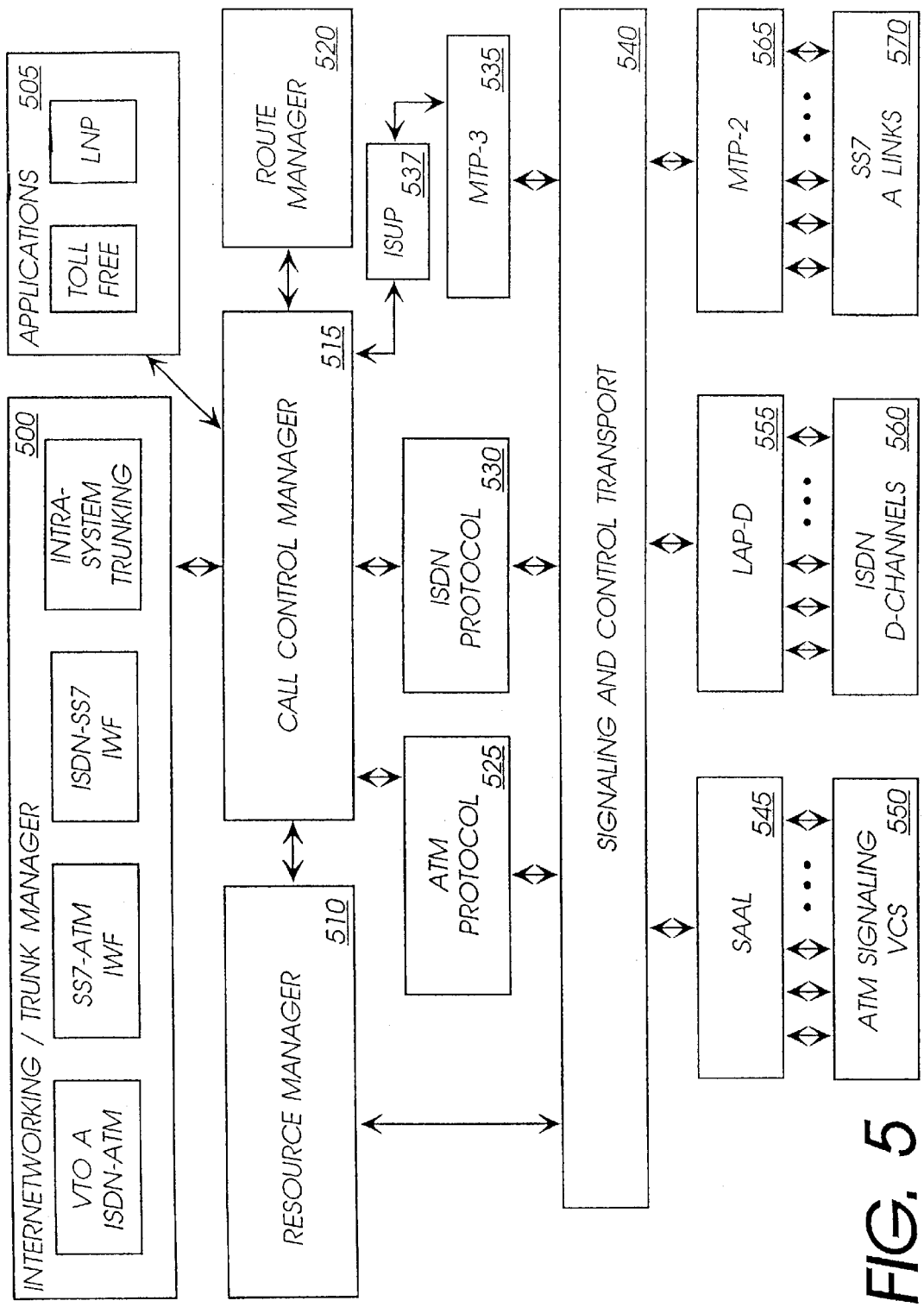
FIG. 5 is a block diagram of components for providing a multiple services internetworking switch.

FIG. 5 is a block diagram of components for providing a multiple services internetworking switch. The components of FIG. 5 can be hardware and/or software components. The components of FIG. 5 provide internetworking between ATM, ISDN and SS7 networks; however, other networks can also be supported.

ATM signals are received from ATM signaling VCs 550, which are virtual connections to an ATM network (not shown in FIG. 5). Signaling ATM Adaptation Layer (SAAL) 545 resides between the ATM network and higher layer functions. SAAL 545 provides reliable transport of messages between components (e.g., ATM switch and host). In one embodiment, ITU ATM signaling protocol Q.2931 is transported over SAAL; however, other signaling protocols can also be used. SAAL 545 passes ATM data to signaling and control transport 540.

ISDN signals are received from ISDN D channels 560 using Link Access Procedure for D Channel (LAP-D) 555. Other ISDN channels (e.g., B channels) can also be supported. LAP-D 555 provides control-level signaling to set up, maintain, and terminate calls. LAP-D 555 passes ISDN data to signaling and control transport 540.

PSTN signals are received from SS7 A links 570 using Message Transfer Part 2 (MTP-2) and Message Transfer Part 3 (MTP-3). MTP-2 provides ordering and delivery of packets for reliable delivery. MTP-3 contains the actual signaling information elements used for call control.

In one embodiment, the lower layer protocols (e.g., SAAL, LAP-D, MTP-2) execute on the modules containing the physical layer (layer 1) signaling interfaces. For ATM and ISDN, the signaling channels, SAAL and LAP-D respectively, are directly associated with particular bearer interfaces. For SS7, the signaling channels, MTP-2, may or may not be directly associated with the bearer channels (e.g., DS0 trunks). Service modules supporting ISDN and SS7 signaling links terminate the link layer protocols, LAP-D and MTP-2, and encapsulate packets for transport to/from the signal processor. In one embodiment, service modules with ATM UNINNI links support termination of the SAAL layer and encapsulation of signaling packets for transport to/from the signaling processor.

Signaling and control transport 540 provides a reliable transport of messages between components. In one embodiment, signaling and control transport 540 requires that each message be acknowledged by the receiving component. Failure to receive an acknowledgement within a predetermined timeout interval results in a retransmission of the message. Failure of a predetermined number of attempts results in an error message being generated and forwarded to a network management device (not shown in FIG. 5) However, other reliable transport protocols can also be used.

ATM protocol 525 is used to process ATM messages transported by signaling and control transport 540. In one embodiment, Private Network-Network Interface (PNNI) and Q.2931 protocols are used; however, other ATM protocols can also be used. ISDN protocol 530 is used to process ISDN messages received from signaling and control transport 540. In one embodiment, the ITU Q.931 protocol is used; however, other protocols can also be used.

SS7 data is received by MTP-3 protocol 535 and ISDN User Part (ISUP) 537. The ISDN user part defines the messages and protocol used in the establishment and tear down of voice and data calls over the public switched network, and to manage the trunk network on which they rely. ISUP is used for both ISDN and non-ISDN calls. In the North American version of SS7, ISUP messages rely on MTP to transport messages between concerned nodes. In one embodiment, Transaction Capabilities Applications Part (TCAP) a Service Control Point (SCP) are used to support the routing and validation of calls. TCAP is a connectionless SS7 protocol for the exchange of information outside the context of a call or connection and typically runs between the switch and the SCP. The SCP is a database that contains information related to calls and subscribers such as, for example, calling card numbers and physical locations of toll free numbers.

The ATM, ISDN and SS7 data are communicated to call control manager 515. Call control manager 515 receives incoming connection requests from network management (e.g., for permanent connections) and from signaling stacks (e.g., for switched connections). Call control manager 515 determines the type of connection required and uses the appropriate signaling entity services to set up the required connections. In one embodiment, call control manager 515 tracks the connections, including monitoring connection status. In one embodiment call control manager 515 is also responsible for generating usage measurement records (e.g., for billing purposes).

In one embodiment, route manager 520 maintains global system routing tables and provides the service of route determination for supported address types. Route manager 520 provides the appropriate information to call control manager 515.

Resource manager 510 provides services to call control manager 515. In one embodiment, resource manager 510 provides connection admission control (CAC), system interface management (SIM) and connection configuration management (CCM) services. CAC determines whether sufficient resources exist to establish requested connections and route selection for the requested connections. SIM communicates with various interface manager running on the system controllers of the system to support CAC. CCM runs on the system controllers and provides an interface to the chassis for configuration of the chassis and accessing the status of the chassis connections.

Applications 505 represent one or more services provided by call control manager 515. For example, local number portability (LNP) and toll-free services can be provided. LNP allows a telephone customer to retain their local phone number if they switch to another local telephone service provider or move to a different locality supported by the same service provider within a LATA.

Internetworking/trunk manager 500 provides services to call control manager 515 to manage trunks used for internetworking over ATM. In one embodiment, internetworking/trunk manager 500 supports voice transmission over ATM (VTOA), an SS7-ATM interworking function (SS7-ATM IWF), an ISDN-SS7 interworking function (ISDN-SS7 IWF), and intra-system trunking. In alternative embodiments, additional and/or different services can also be supported.

In one embodiment, switched connection setup is accomplished in the following manner. The call setup request is received via signaling and control transport 540 from SS7 A-links 570 via MTP-2 protocol 656. The signaling message is forwarded to the signaling processor. In one embodiment the signaling message is forwarded according to a control message protocol for intermodule communications; however any appropriate protocol can be used. The setup message is passed through the appropriate signaling protocol stack (e.g., MTP-3, ISUP) to call control manager 515.

Call control manager 515 access route manager 520 to determine the appropriate egress interface (e.g., SAAL 545) for the call. Call control manger 515 accesses resource manager 510 to reserve appropriate resources for the call. Call control manager 515 determines the appropriate interworking function between the ingress port and the egress port signaling protocols, if any, and uses the appropriate interworking function(s) to create the proper next-hop setup message.

Call control manager 515 sends the next-hop setup message out the appropriate physical interface through the appropriate signaling protocol stack (e.g., ATM protocol 525). At the appropriate juncture in the call set up flow, depending on protocols and interworking type, call control manager 515 initiates a connection configuration via resource manager 510. The configured connection is then used to carry the call.

In one embodiment, permanent virtual connections (PVCs) are maintained between multiple service modules and a system controller. In one embodiment, the connections are ATM PVCs; however, other connections can also be used. To configure the ATM PVCs, a network management application (e.g., CLI, SNMP) is used to cause the system controller to open a PVC between the system controller and the service module(s) to which the system controller is connected. The call control manager and the resource manager of the service module admit and configure the connection. The connection can be used as described above, for example, for control messages.

Figure 6:
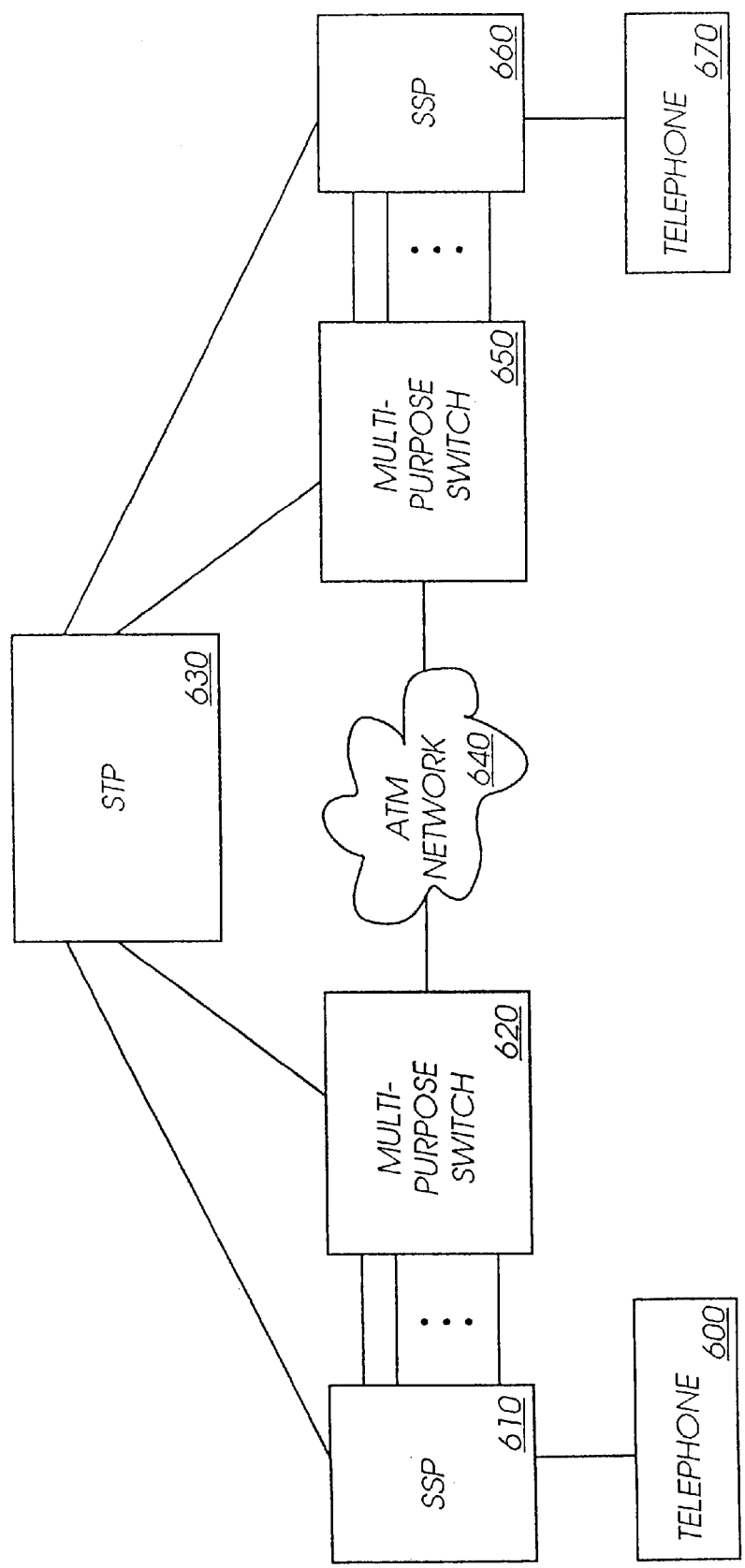
FIG. 6 is a block diagram of an interconnection between two telephones for routing calls according to one embodiment of the invention.

FIG. 6 is a block diagram of an interconnection between two telephones for routing calls according to one embodiment of the invention. For the example of FIG. 6, a telephone call is initiated by telephone 600 and destined for telephone 670; however, the call routing as described is applicable to routing of any telephone call.

Initiation of the call by telephone call 600 causes SSP 610 to generate an Initial Address Message (IAM) and send the message to STP 630 and then to multi-purpose switch 620. The call control manager of multi-purpose switch 620 receives the IAM and determines a route for the call using the route manager of multi-purpose switch 620. The call manager uses the resource manager to determine an egress interface and to reserve the appropriate resources. The call manager also determines the appropriate interworking function between ingress and egress ports signaling protocols, if any, based, at least in part, on the ingress and egress interfaces.

In one embodiment, the interworking function is between SS7, ISUP and the Bearer Independent Call Control Protocol (BICC), which has been standardized by ITU-T and ANSI. The call control manager generates a new IAM identifying multi-purpose switch 620 as the originating switch for the call and a destination point code based on the call routing information. The new IAM is sent to STP 630.

The call control manager of multi-purpose switch 650 receives the new IAM and manages route lookup using the route manager of multi-purpose switch 650. The call control manager invokes the resource manager of multi-purpose switch 650 to determine an appropriate egress interface and to reserve appropriate resources. The call control manager determines the appropriate interworking function, which is BICC in one embodiment. However, other interworking functions can be utilized in alternate embodiments.

In addition to the IAM, the BICC interworking function includes ATM signaling with each voice call having the same identification in both the IAM and the ATM signaling to correlate between the ingress and egress ports for the same call. One embodiment of the BICC employs forward ATM signaling. Another embodiment employs backward ATM signaling.

In the forward ATM signaling embodiment, the call control of multi-purpose switch 620 simulateously initiates the appropriate ATM signaling with the new IAM and sends it to multi-purpose switch 650. Multi-purpose switch 650 call control correlates between the IAM and ATM signaling received from multi-purpose switch 620 to properly receive the call over the ATM trunk between the two switches.

In the backward ATM signaling embodiment, the call control manager of multi-purpose switch 650 invokes a backward ATM signaling to multi-purpose switch 620 to establish a connection with switch 650 and establishes itself as the terminating point of the call. Multi-purpose switch 650 also correlates between the ingress and egress ports of the call based on the destination address.

Once an ATM connection is established between multi-purpose switches 620 and 650 and the call is correlated to that connection, multi-purpose switch 650 sends a new IAM to SSP 660 via the ISUP protocol stack of multi-purpose switch 650 and STP 630.

SSP 660 sends an Address Complete Message (ACM) to multi-purpose switch 650 via STP 630. The call control manager of multi-purpose switch 650 receives the ACM and allocates a DS0 trunk to SSP 660. Other trunk connections can also be used. The call control manager also updates the ACM and sends the updated ACM to multipurpose switch 620 via STP 630.

The call control manager of multi-purpose switch 620 receives the updated ACM and uses the resource manager of multi-purpose switch 620 to allocate a DS0, or other, trunk to SSP 610. The call control manager of multi-purpose switch 620 also further updates the ACM and sends the ACM to SSP 610 via STP 630.

SSP 610 sends a Answer Message (ANM) to multi-purpose switch 620 via STP 630. Multi-purpose switch 620 forwards the ANM to multi-purpose switch 650 via ATM network 640. The call control manager of multi-purpose switch 650 receives the ANM, starts a billing record for the call and forwards the ANM to SSP 660. Telephone 660 is then connected to telephone 670 through SSP 610, multi-purpose switch 620, ATM network 640, multi-purpose switch 650 and SSP 660.

Figure 7:
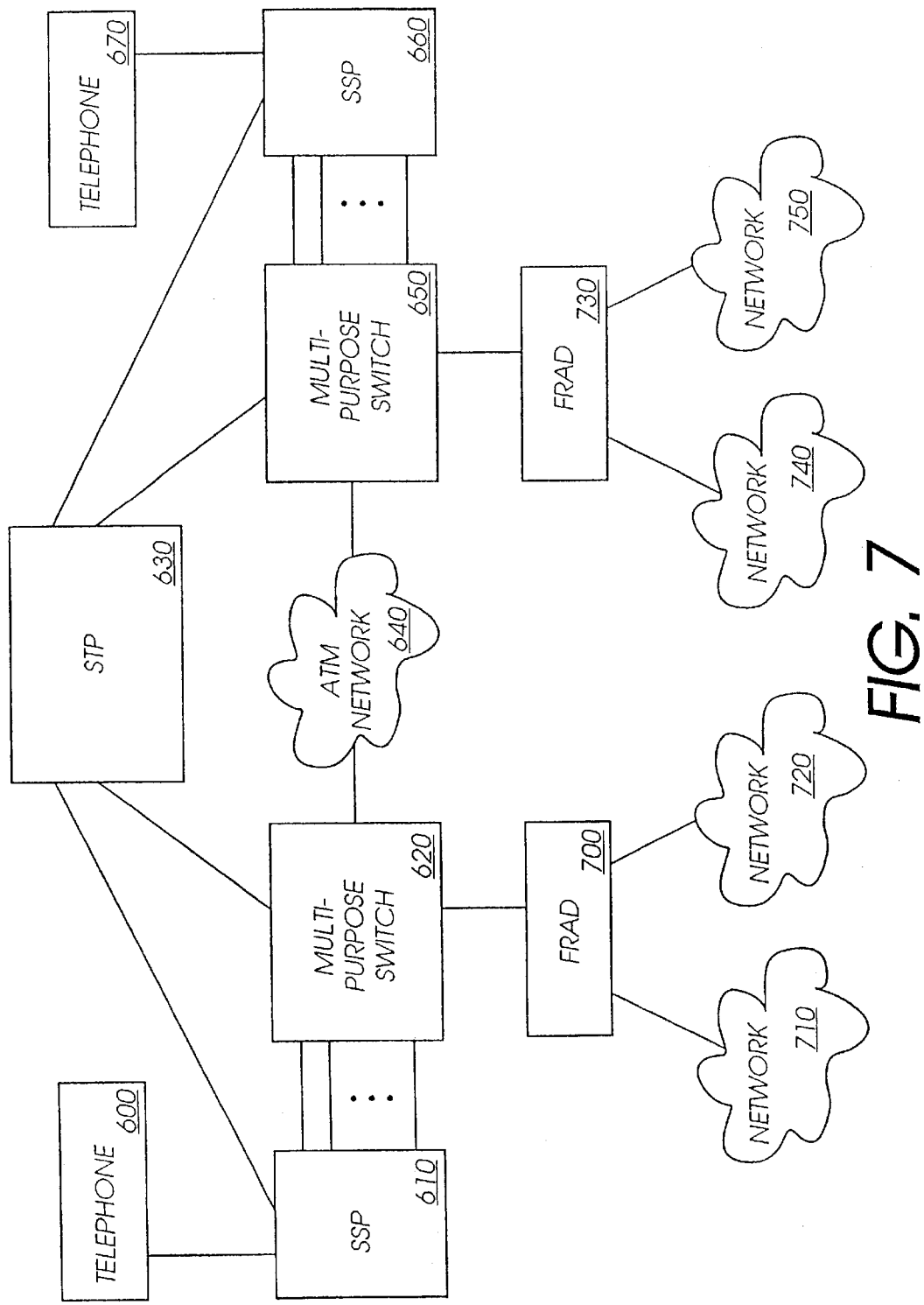
FIG. 7 is a block diagram of one embodiment of an interconnection between multiple devices using multiple protocols.

FIG. 7 is a block diagram of one embodiment of an interconnection between multiple devices using multiple protocols. The telephone interconnection and call routing are accomplished as described above with respect to FIG. 6. The example of FIG. 7 provides frame relay functionality to the telephone interconnection and call routing of FIG. 6. Protocols other than, or in addition to, frame relay can also be supported in a similar manner.

FRAD 700 is coupled to multi-purpose switch 620. Similarly, FRAD 730 is coupled to multi-purpose switch 650. FRAD 700 is also coupled to frame relay based network 710 and to frame relay based network 702 and FRAD 730 is coupled to frame relay based network 740 and to frame relay based network 750. FRAD 700 and FRAD 730 provide an interface between frame relay based networks and multi-purpose switches 620 and 650, respectively. Other devices can also be coupled to FRAD 700 and FRAD 730.

Multi-purpose switches 620 and 650 receive variable-length frames from FRADs 700 and 730, respectively. The frames are converted to constant-length cells for communication over ATM network 640. Multi-purpose switches 620 and 650 provide routing functionality for the cells. Multi-purpose switches 620 and 650 can also receive ATM cells from ATM network 640 that are destined for frame relay devices and convert the ATM cells to appropriate frames for delivery to a FRAD or other frame relay device. Conversion between ATM cells and frames can be accomplished by any manner known in the art.

The components illustrated in FIG. 7 can also be used to route information between frame relay networks or devices to PSTN-connected devices. For example, if a telephone call from telephone 600 is directed to network 750 where the call is to be delivered via voice-over-frame relay, the call is routed as described above, except that rather than establishing a trunk connection with SSP 660, multi-purpose switch routes the call to network 750 via FRAD 730. Similarly, information can be routed from frame relay networks or devices to PSTN devices in a similar manner.

Figure 8:
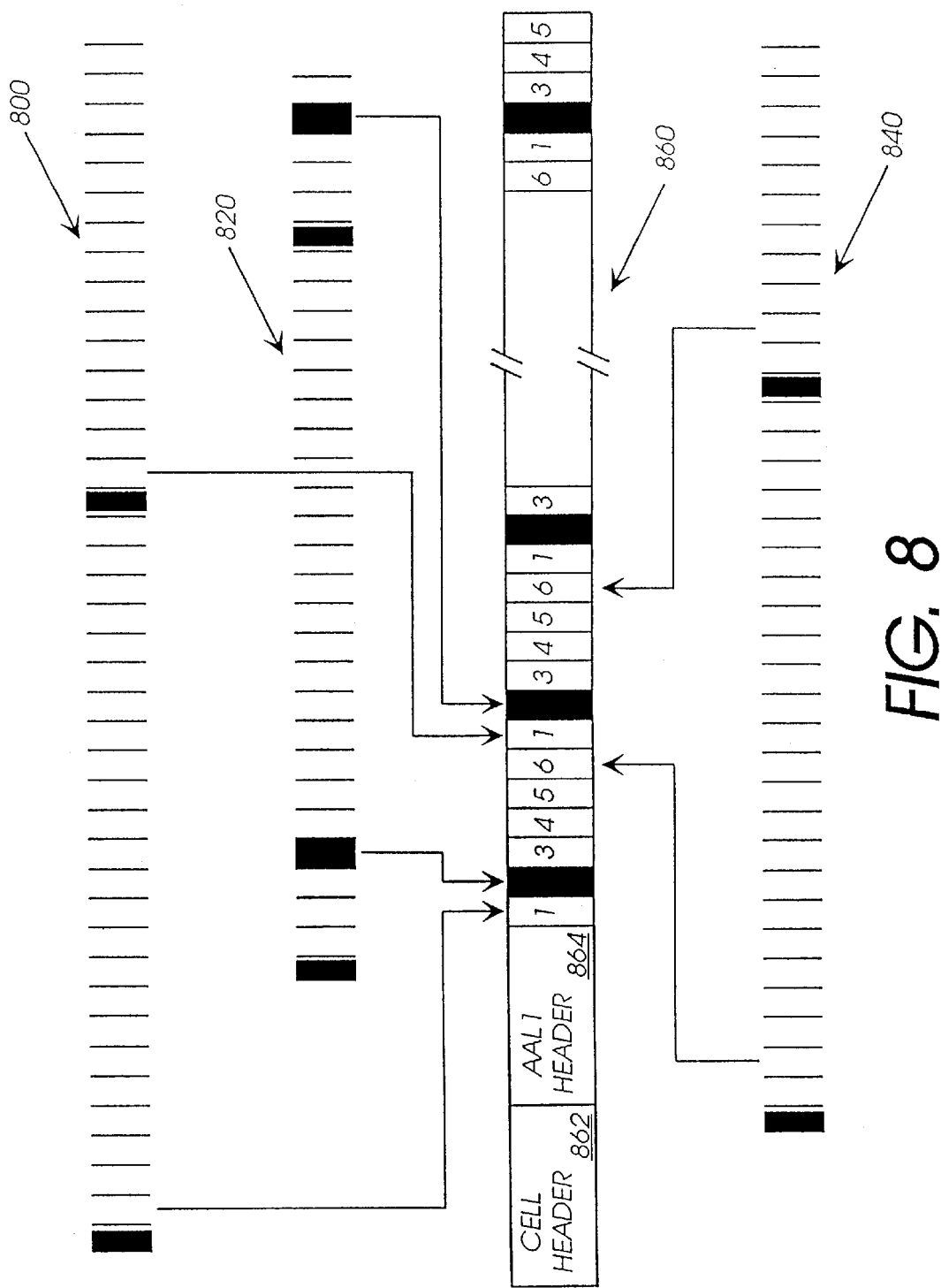
FIG. 8 illustrates one embodiment of a mapping of voice channels to ATM cells.

FIG. 8 illustrates one embodiment of a mapping of voice channels to ATM cells. In one embodiment ATM Adaptation Layer Type 1 (AAL-1) is used for voice channel to ATM mapping. As an overview, AAL is a collection of standardized protocols (e.g., AAL-1, AAL-2, AAL-3/4, AAL-5) that can be used to adapt various data formats to ATM cells. AAL includes a convergence sublayer (CS) and a segmentation and reassembly sublayer (SAR).

In one embodiment, multiple (N) voice calls are mapped to a single ATM virtual connection. In such an embodiment, the N voice calls that originate from the same source (e.g., switch) and are destined for the same next hop are mapped to a single ATM cell according to AAL-1 and carried by a single VCC. The number of calls mapped to a single VCC can be either constant or variable; however having at least six calls allows the calls to meet European Telecommunications Standards Institute (ETSI) requirements for in-country calls for most European countries and enables a call distance of 1000 miles without the need for echo canceling.

Assuming that N is constant and is chosen to be six, when a call is established, a six-channel AAL-1 structure is established. As additional calls are established between the same source and destination as the first call, the additional calls are added to the AAL-1 structure until six calls are active. When a seventh call between the source and the destination is established a second AAL-1 structure and VCC are used in a similar manner. If the number of calls drops to six or less the second VCC is torn down and the calls are communicated with the first AAL-1 structure and VCC. Any number of calls can be supported in a similar manner.

Thus, when fewer than N calls are active, sufficient bandwidth for N calls is reserved for the AAL-1 structure. While some bandwidth may go unused, the timing of the data delivery avoids the need for echo cancellation as described above. Variation of N changes the distance over which a call can travel without the need for echo cancellation according to different standards (e.g., North America, Europe).

When N is dynamic, the first call established causes an AAL-1 structure and associated VCC to be created to carry the call. In one embodiment, the AAL-1 structure starts with a default value of N that is greater than one (e.g., 6). The value of N to be used can be chosen, for example, to provide desirable echo canceling.

As the number of active calls increases, the structure is increased in size to a predetermined maximum value, M. When more than M active calls are established an additional AAL-1 structure is created to support the additional calls. In conjunction with the process of dynamically adding or removing calls to the AAL-1 structure, the source of the calls renegotiates the ATM connection bandwidth up or down to fit the number of active calls. In one embodiment, calls mapped into the same AAL-1 connection are assigned in a unidirectional manner (i.e., only calls from switch A to switch B). In another embodiment, calls can be assigned in a bidirectional manner (i.e., calls from switch A to switch B and calls from switch B to switch A).

Figure 9:
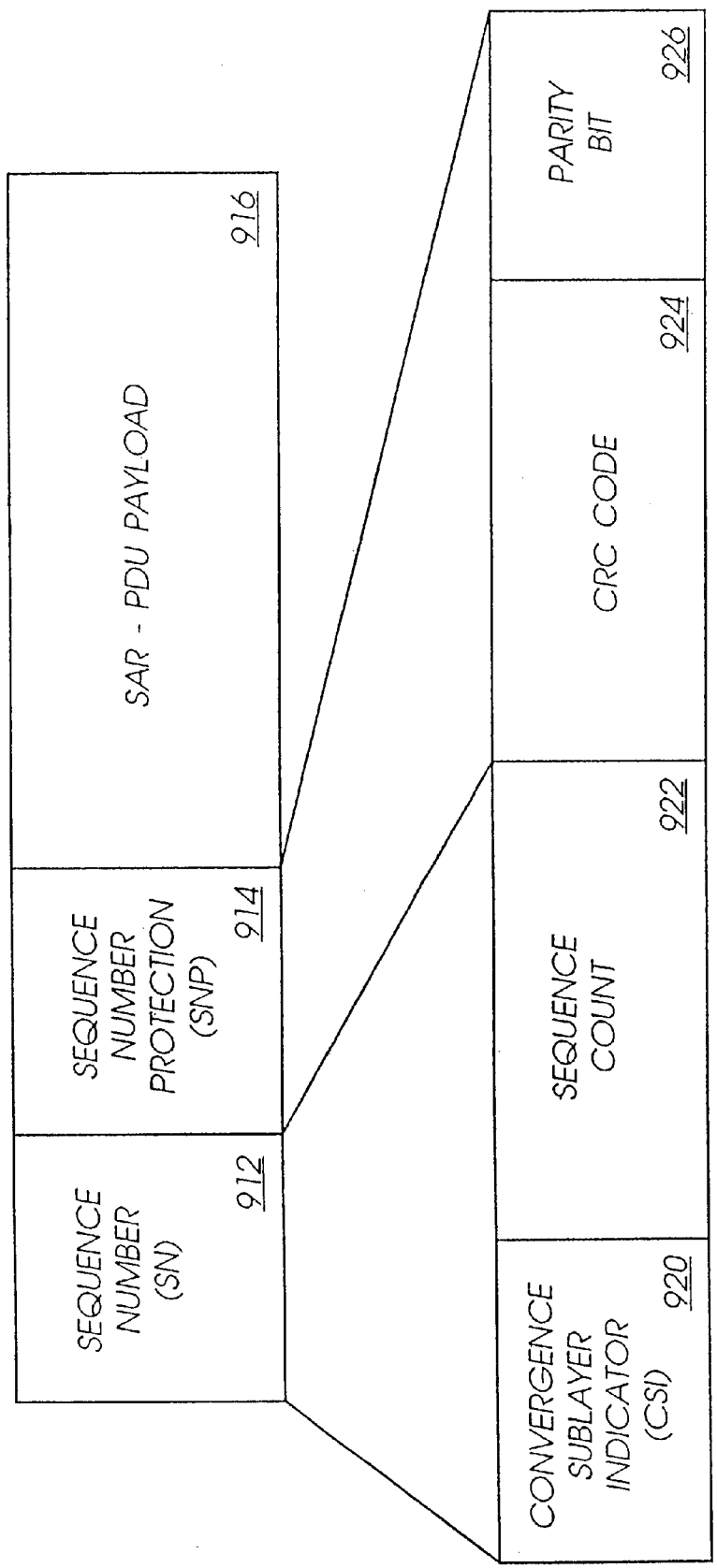
FIG. 9 illustrates one embodiment of a cell structure for use with AAL-1 communications.

FIG. 9 illustrates one embodiment of a cell structure for use with AAL-1 communications. In addition to the above processes, the source of the calls sends a notification to the source of the calls as to changes in the structure. In one embodiment, the sense of parity bit 926 is changed (e.g., from even to odd, from odd to even) in the AAL-1 SAR header containing the first pointer after the change of the structure size. Cycle Redundancy Check (CRC) code 924 is a numerical value that is determined based on the bits in a block of data and is used for error checking purposes. In one embodiment, CRC code 924 and parity bit 926 together provide sequence number protection (SNP) 814. In one embodiment sequence number 912 includes convergence sublayer indicator (CSI) 920 and sequence count 922 for determining the placement of the cell in a sequence of cells.

Referring back to FIG. 8, audio samples from three voice trunk frames (800, 820 and 840) are mapped to ATM cell 860. In one embodiment cell header 862 and AAL-1 header 864 are standard headers. Audio samples from the three voice trunk frames are stored in ATM cell 860 in a known order. In one embodiment, the samples are stored in an interleaved manner. In other words, a first sample from trunk frame 800 is stored, then a first sample from trunk frame 820 and so on to a first sample from trunk frame 840, which is the sixth of six calls to be carried. In alternate embodiments, all of the sample from a particular trunk frame are stored contiguously.

In one embodiment, each trunk frame carries one sample from up to 24 voice calls. The sample to be included in ATM cell 860 is stored in the appropriate position within ATM cell 860. In one embodiment, ATM cell 860 stores 46 or 47 octets of data, which corresponds to 6 ms of voice communications assuming 8-bit samples are taken every 125 μsec; however, other sampling rates, sample sizes and cell sizes could be used. The destination of ATM cell 860 sends data from ATM cell 860 to the appropriate destination trunk frames to be sent to a destination device.

In one embodiment, if fewer than six calls are established, the samples stored in ATM cell 860 that do not correspond to active calls are not used. Thus, the bandwidth for six calls is used whether or not six active calls exist. While this allows available bandwidth to be unused, the structure of the cell provides the echo cancellation benefits described above. The example, of FIG. 8 illustrates an embodiment where bandwidth for six calls is used for each AAL-1 structure, a different number of calls and/or a dynamic number of calls can be supported as described above.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method for jointly facilitating a telephone call by a first device and a second device, the method comprising:

communicating routing information between the first device and the second device using a first signaling protocol and a first network;

allocating an available virtual channel in a cell based bearer connection between the first device and the second device established using a second cell based signaling protocol and over a second network, with said cell based bearer connection having a predetermined plurality of fixed size virtual channels for facilitating up to a corresponding plurality of telephone calls, and cells of said cell based bearer connection being transmitted continuously in accordance with said second cell based signaling protocol as long as at least one of the virtual channels is allocated to facilitate a telephone call; and facilitating said telephone call through said allocated virtual channel of said cell based bearer connection.

2. The method of claim 1 wherein said cell based bearer connection is an established cell based bearer connection having at least one of its predetermined plurality of virtual channels already allocated to facilitate at least one other telephone call.

3. The method of claim 1 wherein the method further comprises establishing said cell based bearer connection, and said available virtual channel is the first virtual channel of said cell based bearer connection being allocated to facilitate a telephone call.

4. The method of claim 1 wherein the second signaling protocol comprises a Asynchronous Transfer Mode (ATM) signaling protocol.

5. The method of claim 4 wherein the ATM signaling protocol comprises a Type I Adaptation Layer of the Asynchronous Transfer Mode (ATM) signaling protocol (AAL1).

6. The method of claim 1 wherein said communicating of routing information between the first device and the second device comprises:

communicating a first device indicator and a second device indicator to a first signaling link in the first network;

routing the first device indicator and the second device indicator to the second device via the first network;

determining by the second device whether a callee device is available to receive the telephone call;

communicating by said second device an indication of whether the callee device is available to receive the telephone call to a second signaling link in the first network; and routing the indication of whether the callee device is available to receive the telephone call to the first device via the first network.

7. The method of claim 1 wherein the predetermined plurality of virtual channels equal six (6).

8. An apparatus for jointly facilitating telephone calls with another apparatus, the apparatus comprising:

means for communicating routing information to said other apparatus using a first signaling protocol and a first network;

means for allocating a virtual channel in a cell based bearer connection between the apparatuses using a second cell based signaling protocol and over a second network, with said cell based bearer connection having a predetermined plurality of fixed size virtual channels for facilitating up to a corresponding plurality of telephone calls, and cells of said cell based bearer connection being transmitted continuously in accordance with said second cell based signaling protocol as long as at least one of the virtual channels is allocated to facilitate a telephone call; and means for facilitating said telephone call through said allocated virtual channel of said cell based bearer connection.

9. The apparatus of claim 8 wherein said cell based bearer connection is an established cell based bearer connection having at least one of its predetermined plurality of virtual channels already allocated to facilitate at least one other telephone call.

10. The apparatus of claim 8 wherein said second means further establishes said cell based bearer connection, and said available virtual channel is the first virtual channel of said cell based bearer connection being allocated to facilitate a telephone call.

11. The apparatus of claim 8 wherein the second protocol comprises a Asynchronous Transfer Mode (ATM) signaling protocol.

12. The apparatus of claim 11 wherein the ATM signaling protocol is a Type I Adaptation Layer of the Asynchronous Transfer Mode (ATM) signaling protocol (AAL1).

13. The apparatus of claim 8 wherein the means for communicating routing information between to said other apparatus comprises:

means for communicating a first device indicator and a second device indicator to a first signaling link in the first network to be routed to the other apparatus; and means for receiving back an indication from said other apparatus via the first network, on whether a callee device is available to receive the telephone call.

14. The apparatus of claim 8 wherein the predetermined plurality of virtual channels equal six (6).

15. A distributed system comprising:

a first device;

a network coupled to the first device; and a second device coupled to the network;

wherein the first and the second devices jointly facilitating a phone call over a virtual channel in a cell based bearer connection between the first and second devices established using a cell based signaling protocol over said network, with said cell based bearer connection having a predetermined plurality of fixed size virtual channels for facilitating up to a corresponding plurality of telephone calls, and cells of said cell based bearer connection being transmitted continuously in accordance with said cell based signaling protocol as long as at least one of its virtual channels is allocated wot facilitate a telephone call.

16. The distributed system of claim 15 wherein the cell based signaling protocol comprises a Asynchronous Transfer Mode (ATM) protocol.

17. The distributed system of claim 16 wherein the ATM protocol comprises a Type I Adaptation Layer of the Asynchronous Transfer Mode (ATM) protocol (AAL1).

18. The distributed system of claim 15 wherein the predetermined plurality of virtual channels equal six (6).

* * * * *